DONALD J. HAMRICK
INVENTOR

Nov. 11, 1969  D. J. HAMRICK  3,477,122
METHOD OF MAKING THERMOCOUPLE PROBE
Filed Nov. 27, 1964  3 Sheets-Sheet 3

DONALD J. HAMRICK
INVENTOR

United States Patent Office 3,477,122
Patented Nov. 11, 1969

3,477,122
METHOD OF MAKING THERMOCOUPLE PROBE
Donald James Hamrick, Vancouver, Wash., assignor to Syndyne Corporation, Vancouver, Wash., a corporation of Delaware
Filed Nov. 27, 1964, Ser. No. 414,222
The portion of the term of the patent subsequent to July 11, 1985, has been disclaimed
Int. Cl. H01v 1/08, 1/04
U.S. Cl. 29—573   4 Claims

ABSTRACT OF THE DISCLOSURE

The method of manufacturing a thermocouple device wherein insulated wires are inserted into a tubular body in association with metal powder. Heat is applied to melt the insulation at the ends of the wires and expose the same and form a thermocouple junction.

---

The invention relates to thermocouple probes and particularly to thermocouple probes for use in detecting the temperature of high temperature fluids. The invention will be described with respect to a thermocouple probe which has been particularly designed for detecting temperatures of exhaust gases in internal combustion engines, particularly diesel engines. The invention is obviously not intended to be limited to such uses.

Prior thermocouple probes for this application have primarily been of two types: The first type having the thermocouple members of stranded form joined at certain end portions thereof with the body or housing of the probe directly, and the second type having the thermocouple members in sections, certain sections being extensions of solid form leading into the body and joined to the body. These extensions at the free ends are secured or joined to stranded thermocouple member sections. The difficulty has been that in the first type of thermocouple probe, the thermocouple members have fractured at the junction thereof with the housing or body. It is believed that this has been caused by thermal shock, contrasting expansion and by embrittlement due to grain growth with the log of time at elevated temperatures then being subject to mechanical shock. In the second type of probe, the failure has most frequently occurred at the junction of the stranded thermocouple member section with the solid thermocouple member section. I believe that these fractures were caused primarily by fatigue, over temperature or stress.

A principal object of the present invention is to overcome the above problems by providing a thermocouple in which fractures of the types referred to above will not occur despite subjection to expansion, thermal shock, mechanical fatigue, or stress. A second object of the invention is repeatable results of measurement. A further object of the invention is efficient manufacturing methods. A further object of the invention is the elimination of excessive expansion of the shielding materials encapsulated in the external shell so as to avoid an explosion due to the rapid expansion of gases or vapors inside the probe and the resultant propelling of fragments which have a possibility of extensively damaging the apparatus in which it is mounted, if not, that apparatus in proximity to it. A further object of the invention is a design that is highly resistant to abuse.

Figure 1:
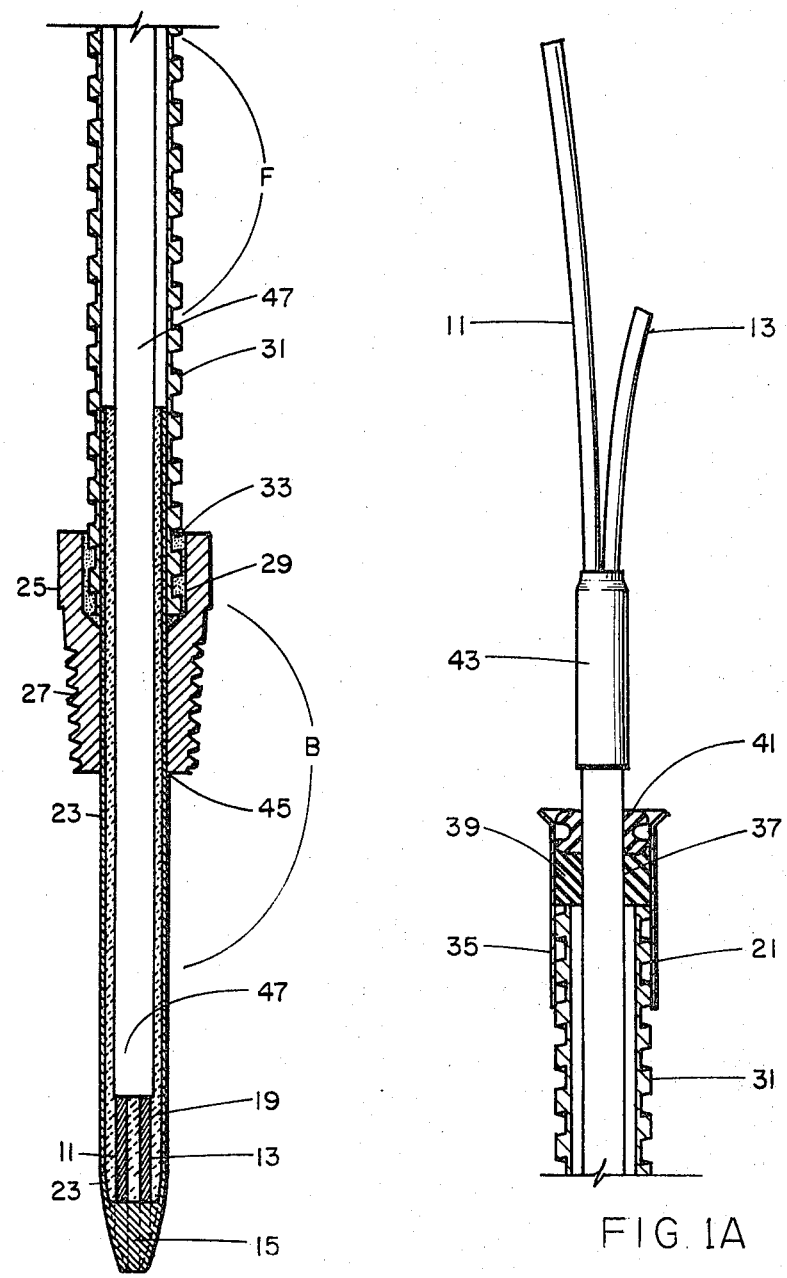
Figure 2:
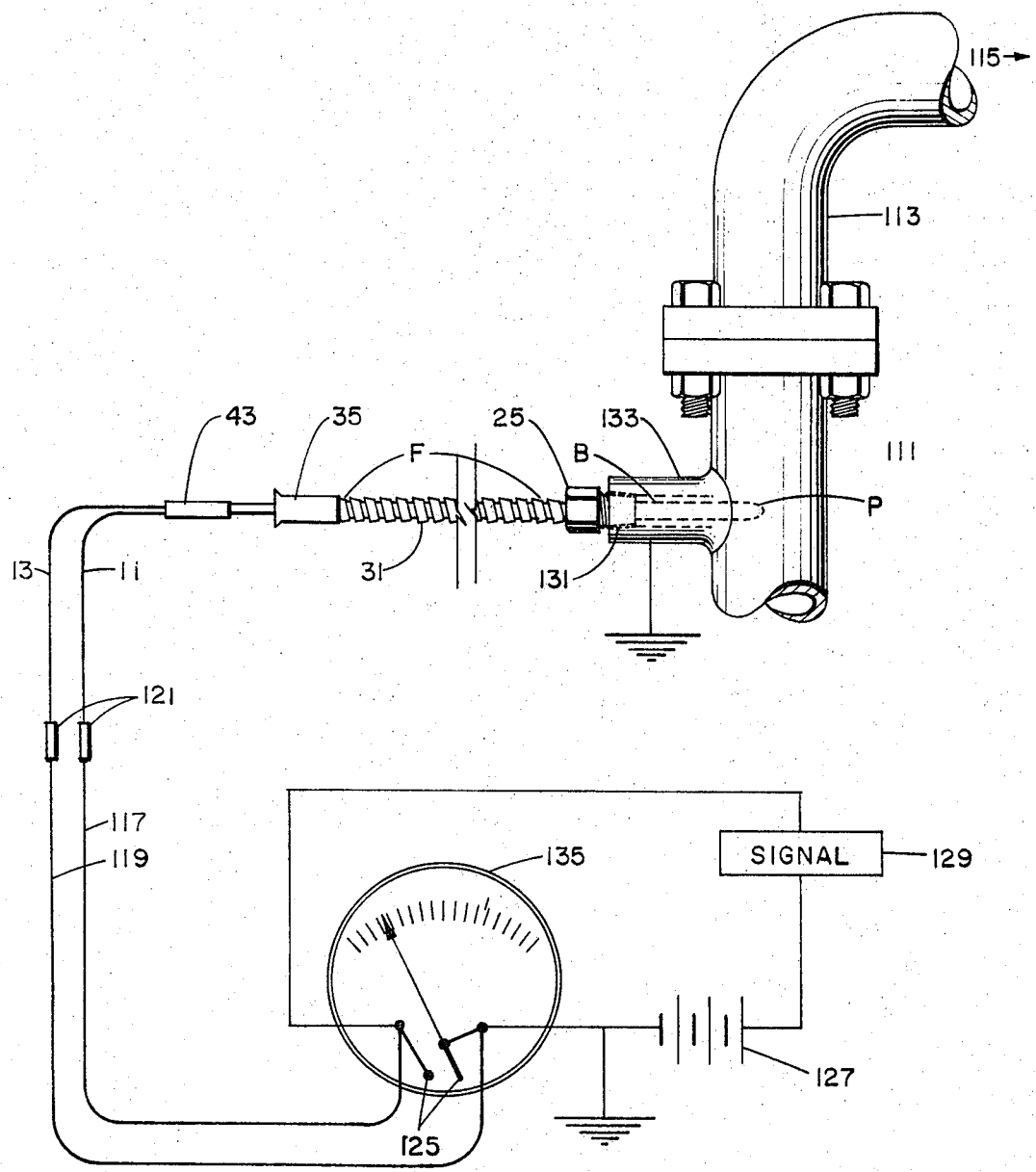
Figure 3:
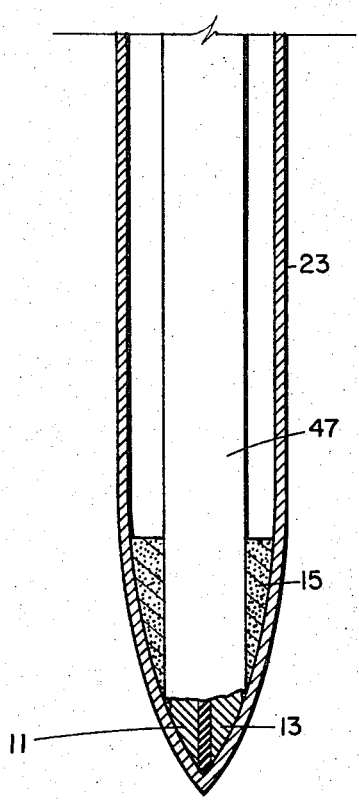
Figure 4:
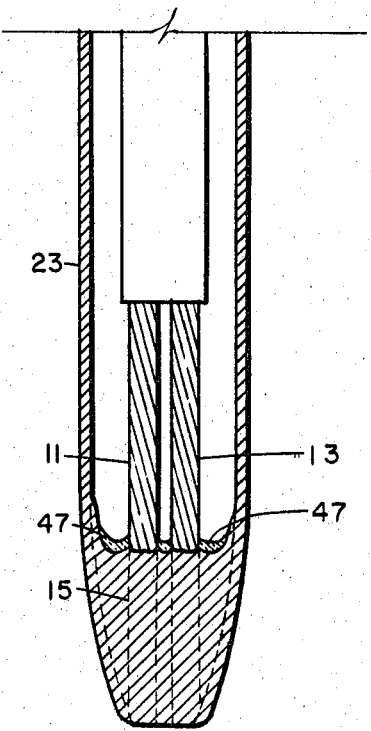

Various other objects of the invention will be apparent from the following description taken in connection with the accompanying drawings wherein FIGURE 1 is an enlarged vertical sectional view through the main portion of the probe broken into two parts to facilitate delineation at large scale; FIGURE 2 is a view showing the probe installed in the exhaust pipe leading from the manifold of an internal combustion engine; FIGURE 3 and FIGURE 4 shows successive steps in the process of manufacturing my thermocouple probes.

Referring to the drawings and particularly to FIGURE 2 the probe generally indicated by the capital letter P, is shown mounted in the exhaust pipe 111 which is connected to the manifold 113 of the internal combustion engine 115. The probe P has thermocouple wires 11 and 13 projecting therefrom and fastened by connectors 121 to leads 117 and 119 which in turn attach to a meter 135 equipped with internal switching contacts 125. Operation of the meter completes a signal alarm circuit consisting of a battery 127, light, buzzer or other means of signaling or alarming 129. Of course, if it is desired to merely look at the meter rather than to have a visible or audible alarm or control function, the battery 127, the signal 129 and internal switching contacts 125 are unnecessary.

It is repeated here that the installation shown in FIGURE 2 is only illustrative of one use of the thermocouple probe of my invention.

Referring to FIGURE 1, the main portion of my thermocouple probe comprises a body portion which is generally indicated by the letter B, which is essentially a rigid structure, and a flexible portion F which extends from the body portion over the thermocouple members 11 and 13 as they extend to the leads 117 and 119. The body portion B comprises a tubular housing member which is a circular cross-section throughout its length and is hollow to receive the thermocouple members 11 and 13 which are surrounded by insulation 19. The thermocouple members are in stranded form and securely held in a metallic flow 15 contained in the closed end of the tubular body member 23. Surrounding the thermocouple members 11 and 13 is insulation 19 in the form of ceramic material cured and fired in place. Surrounding and secured to the tubular body member 23 is a nut 25, for the particular application shown, having pipe threads 27 to fit in complementary pipe threads 131 in a weld fitting 133 on the pipe 111 or in a tapped hole in the manifold. The nut is countersunk at 29 to provide a cavity to receive the one end of flexible metal conduit 31 which is secured in place by a cement 33.

At the opposite end of the flexible metal conduit 31 is a ferrule 35 which is secured to the flexible metal conduit 31 by means of a soldering operation or other suitable means of connection. Within the ferrule and sourrounding the thermocouple members 37 is a body of adhesive material 39 which forms a seal. Said adhesive material 39 is of the room temperature vulcanizing silicone compound type. Fitting on the top of this adhesive material 39 is an elastomer grommet 41 which is held in place by means of the adhesive material 39. The thermocouple members are separated from one another at the ends which are remote from the body unit B and a shrinkable plastic sleeve 43 is fitted over the separated thermocouple members 11 and 13 and then heated to tightly grip the wires. The thermocouple members 11 and 13, at the free ends thereof, are deliberately cut to different lengths so that there will be no electrical short at their connection with the leads 117 and 119 leading to the meter 135.

Now, referring to FIGURES 3 and 4, the method of producing my thermocouple probe is shown. It might be here stated that the order of certain of the steps is vital whereas the order of certain other steps is not critical. For instance, if several components are to be secured together, it is generally immaterial whether one component is formed before the other, just so that there is an availability of components at the time of assembly. Nevertheless, I will describe the order of work I have utilized.

A stainless steel nut 25 is secured to the protective tubular body 23 by means of a high temperature silver soldering ring 45 which is applied in its cold form as a preform to the tubular body 23 and is positioned by a jig and caused to flow to position after the application of the proper flux by the application of induction heat locally.

Referring to FIGURE 3 stranded thermocouple members 11 and 13 which are covered with an individual layer of glass saturated in silicone varnish and jointly covered by a layer of glass saturated in silicone varnish 47, are ground on the end after having been cut to length in such a manner so as to produce a conical point with a partition between the two members of the thermocouple extending to the furthermost tip of the cone and feathered back from that extremity.

Referring to FIGURE 3, a deposit of metal powder 15 is placed in the tubular body 23 which has been swagged closed to a bullet point. At the present time I am using a metal powder 15 which forms a eutectic alloy which alloy has a higher melting point than the component metallic elements in powder form. The component metallic elements are melted and atomized premitting it to form in little droplets due to the surface tension of the liquid and after condensation is screened for grain size. The present invention uses approximately 50 mesh powdered metal consisting of 72.5% nickel, 5% silicone, 3.5% boron, 15% chromium and 4% iron. Attention must be given so as to select the proper wall thickness for the tubular body 23 which permits complete closure of the tube in the swagging process and forbids a loss of the metal powder 15. The housing part 23 is subjected as a test to a hundred and fifty pound helium pressure test to assure its tightness after the swagging process so as to prevent leakage of the molten metal which is produced in process by induction heating of the powdered metal 15. This is a brazing process able to be differentiated from welding in as much as brazing constitutes a disolving of one metal into another acting as the solvent, whereas welding constitutes melting and re-precipitating of the metals into new grain growth.

The thermocouple members 11 and 13 are inserted into the tubular body 23 and thrust downward to the very extremity of the closure of the tubular body 23.

Referring to FIGURE 4 the tubular body 23 with the thermocouple members 11 and 13 immersed in the powdered metal 15 is positioned by a jig inside the field of a high frequency induction coil and is elevated to a temperature satisfactory to melt the powdered metal 15 which becomes a eutectic alloy. The longer the heat is applied the more near the remelt temperature approaches the melt temperature of the base metal. An upward flow of the glass insulation 47 about the thermocouple members 11 and 13 bares them automatically so as to expedite their junction. The tube 23 with the thermocouple members 11 and 13 secured within the eutectic alloy 15, is then ground to uniform profile by means of a jig. The grinding of the profile in a regulated fashion permits the repeat of a transient time response in conjunction with the assembly method and even though the external form of the tube 23 were to be removed entirely on the end so as to bare the alloy 15, the alloy, which is selected for its ability to resist the environmental atmosphere as is the tube 23, exposes itself as a homogenous mass of metal unable to be differentiated readily.

Referring to FIGURE 1, a shrinkable tube 43 is attached to the thermocouple members 11 and 13 and heated to cause the tubing 43 to shrink, gripping the thermocouple members 11 and 13 tightly and prevents them from pulling apart and prevents raveling of the insulation 47.

At this point liquid ceramic 19, known to those in the art as slip, is inserted into the tube 23 by injection and is put into an oven at low temperature, e.g., 140° F., to cure for an extended period of time so as to gradually eliminate moisture from the ceramic slip and forbid bubbles from occurring as a result of the expansion of moisture when the firing heat is applied to the ceramic 19.

Referring to FIGURE 1, a solder ring 21 is placed around one end of the spiral 31 and the flanged end piece 35 is placed on the end of the spiral 31 over the solder ring 21 and joined by induction heat. The end of the spiral 31 opposite the flared end piece 35 is attached to the nut 25 with a zirconium cement 33.

The flared end piece 35 is filled with an RTV compound 39 as previously described and an elastomer grommet 41 is inserted into the RTV 39 until the grommet 41 is flush with the top of the end piece 35.

The thermocouple is operated by heating the junction of two dissimilar metals which gives rise to an electromotive force proportional to the temperature achieved. The leads of the thermocouple are attached to a meter, relay amplifier, or other alarm means which means are intended to serve as warning or control devices for the operator of the device, in which the thermocouple is installed, said device being in this case a diesel engine. The thermocouple of my description is specifically designed for use in a diesel engine but the invention is not intended to be limited to that use.

The thermocouple is mounted in the manifold or exhaust pipe of a diesel engine so as to measure the temperature of the gases coming from the engine exhaust system. In such a position the thermocouple housing is subjected to gases whose temperatures are normally about 1200° F. and which are high in sulfurous content and therefore highly corrosive. It is therefore necessary to construct the housing for the thermocouple from some material which is resistant to corrosion by such gases so as to prevent corrosion and erosion of the metal comprising the body or housing. Metals such as 347 stainless steel or Hastalloy X satisfy the requirements, the latter being a nickel-chromium steel alloy which has excellent properties for the subject use for which my thermocouple was designed. Even though the housing is ground away to expose the alloy containing the thermocouple members, corrosion and erosion is not a problem because the alloy formed from the powder is one which could be classed as "hard chrome." The aforementioned grinding of the swagged tip of the housing so as to expose the measured alloy containing the thermocouple members is responsible for repeatable temperature readings by different thermocouples by eliminating the possibility of variance in the mass of the junction of the members and different response times. Other methods of fastening cannot provide very good repeatability due to response time uniformity between various thermocouple because they do not alloy the predictability of mass about the thermocouple junction.

The predictability of the thermocouple of my invention is due also in part to the ability to control the position of the thermocouple members in the body due to the method of securing the thermocouple members to said body or housing. By placing the thermocouple members in position while they are cold and then securing them to the housing by means of forming an alloy from powdered metal, one can always be sure of the position of the wire within said housing. When the thermocouple members are secured to the housing by conventional welded means, not only is the mass of the junction unpredictable, but also the position due to the fluid nature of the whole securing process and the bodies involved.

The thermocouple of my invention is not susceptible to fracture by mechanical shock because of the means of connecting the thermocouple members to the body or housing. With my process the members are in a mass which is solvent in the body and an integral part of it.

Conventional methods of connecting the members to the housing are either unable to establish the thermocouple member as an integral part of the body or cannot allow a firm connection, due to the thickness of the body wall, or both. The method for securing the thermocouple members to the housing in the thermocouple of my invention allows the use of stranded thermocouple members as a single unit throughout the entire thermocouple without any interrupting such as the interruption necessary when solid members are used part way becoming stranded above and necessarily vulnerably joined.

The thermocouple of my invention is resistant to explosion because of the manner in which the insulating ceramic is installed. After the thermocouple members are secured to the housing, liquid ceramics, known to those in the art as slip, is injected into the housing with the result that the thermocouple members are contained within the slip. The housing containing the slip is then heated at a temperature which will allow the ceramic to remain fluid while air and moisture are being driven out. The temperature used with the particular ceramic that I use is about 140° F. When the ceramic is hardened the housing is then free from all voids such as are created by air and water vapor which, I believe, has been the major cause of thermocouple explosions and the resultant damage to turbo charger systems from the fragments.

While I prefer to use the specific metals, adhesives and other materials mentioned, other types might be used. The important features of the invention are embodied in the resultant product from the materials and methods of production such as a thermocouple in which the thermocouple members are secured to a metallic flow which is then independent of the tubular body member at least at the time of securement of such thermocouple members to such body, and at such time, such body becomes united with and secured to the body member.

I claim:
1. The method of manufacturing a thermocouple device including the steps of:
   providing a pair of stranded thermocouple members covered with a glass layer,
   positioning the members in a tubular body having one end closed so that one end of the members contacts the closed end of the tubular body,
   placing metal powder in the tubular body for contacting the members and the tubular body, and
   heating the members, body and metal powder at a temperature sufficient to melt the glass and metal powder to form a thermocouple junction with resultant exposure of the thermocouple wires adjacent the junction.

2. The steps in the manufacture of a thermocouple device comprising:
   inserting into a tubular steel housing and toward a blind end of said housing a pair of stranded thermocouple wires which are covered by fusible insulation,
   positioning one set of ends of said insulated stranded wires at said blind end,
   introducing powdered brazing metal into said tubing and creating a pocket of the same in said blind end and around said one set of wire ends,
   heating said blind end, said set of ends of insulated wires, and powder to a temperature to melt and expose said wires at said ends and to melt said powder to create a bond between said exposed wires and melted powder and housing and create a thermocouple junction.

3. The steps of claim 2 wherein said temperature is sufficient to melt said ends of said stranded wires to assure an intimate connection between the adjacent unmelted wire portions and the hardened pool of melted powder.

4. The steps of claim 2 wherein flowable, bakable insulating material is introduced into said housing and around said stranded wires,
   and baking said filled housing to harden said insulating material.

References Cited

FOREIGN PATENTS 518,388   11/1955   Canada.

ALLEN B. CURTIS, Primary Examiner

U.S. Cl. X.R.

136—233